Patented May 7, 1935

2,000,836

UNITED STATES PATENT OFFICE 2,000,836

PROCESS OF MANUFACTURING FROM NITROCELLULOSE, SKINS AND ENVELOPES PARTICULARLY ADAPTED FOR USE AS ARTIFICIAL SAUSAGE CASINGS

Franz Goldberger, Breda, Netherlands, assignor, by mesne assignments, to Sylvania Industrial Corporation, Fredericksburg, Va., a corporation of Virginia No Drawing. Application January 22, 1934, Serial No. 707,864. In Germany September 5, 1931

8 Claims. (Cl. 18—57)

The invention has reference to artificial sausage casings or artificial skins for the manufacture of sausages, head cheese, lard and other articles of the meat packing and similar industries and it is intended to improve the quality of such goods and to make them substantially equivalent to the natural articles.

Artificial skins and sausage casings of the kind referred to are being manufactured in large quantities from substances which can be readily gelatinized or solidified, such as for instance cellulose, esters of cellulose and other cellulose compounds and the like, by causing these substances, for example a solution of viscose, to be forced from an annular nozzle into a precipitating bath, or by causing a solution of nitrocellulose or its equivalent to dry up into a thin layer of a homogeneous film or foil with smooth surfaces.

According to the invention, it has been found that artificial sausage casings, and similar envelopes become very nearly equivalent to the natural guts by being manufactured from a partially denitrated nitrocellulose having a nitrogen content not exceeding two percent. Such sausage casings show extremely favorable qualities as regards cutting and produce an advantageous appearance of the sausages enveloped therewith. When filled with sausage meat, they can be cut easily and exactly and, owing to their good contracting quality, when drying, they closely and smoothly enfold the sausage mass whereby is avoided the disagreeable formation of wrinkles provoking a bad appearance of the sausage.

Furthermore the artificial sausage casings of the present invention show the firmness of natural guts against pricking i. e., in contradistinction to envelopes made from viscose, they do not burst, when a hole is pricked into the same during the cooking of the sausage. On the other hand, their swelling properties have been greatly reduced as compared with envelopes of pure cellulose, so that their strength remains considerably higher than in the case of skins and envelopes consisting of pure cellulose, even after they have been treated with water or boiled, while, at the same time, they do not have the rigidity and the high inflammability of the skins made of non-denitrated cellulose-nitrates. Their swelling in water is only 50 percent while the artificial casings made from viscose show a swelling of 90 percent and therefore, cannot constitute a perfect substitute for natural guts because they become flabby during the boiling on account of their excessive swelling.

According to the invention it is of advantage to carry out the partial denitration which may be effected after the solidifying of the envelopes formed from cellulose-nitrate, only so far that the contents of nitrogen of the finished skin or envelope will remain below about 1.5 percent and on the other hand does not go down much below 0.5 percent. Of course other percentages of nitrogen not exceeding 2 percent may be employed for carrying out the invention. The partial denitration may be produced by means of well known denitrating substances for instance sulfo-hydrates or reducing agents.

It is a surprising fact that, even with a partial denitration leaving in the cellulose nitrate a nitrogen content as high as 2%, the casing still retains the strength required for filling the same with sausage meat. This advantage is important in the case of using a filling machine for inserting the sausage meat or mass in the envelopes because the favorable suppleness and elasticity of the envelopes and their great firmness prevent them from bursting during or after the mechanical filling operation. Another surprising fact is that the partially denitrated envelopes of nitrocellulose possess a sufficient permeability for water vapor so as to allow a quick drying of the sausage mass particularly in the case of dried or hard sausages.

What I claim is:

1. The process of manufacturing artificial skins and envelopes particularly adapted for use as artificial sausage casings, which consists in shaping the envelope from cellulose-nitrates and thereupon partially denitrating with sulphohydrates the shaped envelope so that its nitrogen content remains between about 1.5 and 0.5 percent.

2. Envelopes particularly adapted for encasing sausages and other alimentary products and consisting of partially denitrated nitrocellulose with a nitrogen content between about 1.5 and 0.5 per cent.

3. A process of manufacturing artificial skins, casings and envelopes particularly adapted for use as sausage casings, which comprises shaping a casing from a nitrocellulose and partially denitrating the nitrocellulose so that its nitrogen content lies between 0.5% and 2%.

4. In a process for manufacturing artificial skins, casings and envelopes particularly adapted for use as sausage casings, the improvement which consists in denitrating a nitrocellulose skin so that its nitrogen content lies between 0.5% and 2%.

5. A process for manufacturing artificial skins, casings and envelopes particularly adapted for use as sausage casings, which comprises extruding a solution of nitrocellulose through an annular orifice forming a hollow tubular body, solidifying said body, and denitrating the nitrocellulose so that its nitrogen content lies between 0.5% and 2%.

6. Envelopes particularly adapted for encasing sausages and other alimentary products, comprising a partially denitrated nitrocellulose having a nitrogen content between 0.5% and 2%.

7. Envelopes particularly adapted for encasing sausages and other alimentary products and consisting substantially of a tubular body of partially denitrated nitrocellulose having a nitrogen content between 0.5% and 2%.

8. Envelopes particularly adapted for encasing sausages and other alimentary products and consisting of a nitrocellulose which swells in water to the extent of not more than about 50% and has a nitrogen content between 0.5% and 2%.

FRANZ GOLDBERGER.